(12) United States Patent
Freshman et al.

(10) Patent No.: US 9,232,030 B2
(45) Date of Patent: Jan. 5, 2016

(54) AMPLIFYING COVER FOR A PORTABLE AUDIO DEVICE

(71) Applicants: Matthew Freshman, Los Altos Hills, CA (US); Abraham Shawky Farag, Palo Alto, CA (US)

(72) Inventors: Matthew Freshman, Los Altos Hills, CA (US); Abraham Shawky Farag, Palo Alto, CA (US)

(73) Assignee: Matthew Freshman, Los Altos Hills, CA (US)

( * ) Notice: Subject to any disclaimer, the term of this patent is extended or adjusted under 35 U.S.C. 154(b) by 0 days.

(21) Appl. No.: 14/024,616

(22) Filed: Sep. 11, 2013

(65) Prior Publication Data

US 2014/0069736 A1    Mar. 13, 2014

Related U.S. Application Data

(60) Provisional application No. 61/699,712, filed on Sep. 11, 2012.

(51) Int. Cl.
*G10K 13/00* (2006.01)
*H04M 1/02* (2006.01)
*H04M 1/04* (2006.01)
*H04M 1/03* (2006.01)

(52) U.S. Cl.
CPC .............. *H04M 1/0202* (2013.01); *H04M 1/04* (2013.01); *G10K 13/00* (2013.01); *H04M 1/035* (2013.01)

(58) Field of Classification Search
CPC ...................................................... G10K 13/00
USPC ................................................. 181/177, 176
See application file for complete search history.

(56) References Cited

U.S. PATENT DOCUMENTS

| 3,748,583 | A | 7/1973 | Andersen et al. | |
|---|---|---|---|---|
| 5,832,079 | A | 11/1998 | Rabe | |
| 6,256,193 | B1 | 7/2001 | Janik et al. | |
| 7,778,431 | B2 * | 8/2010 | Feng et al. | 381/160 |
| 8,028,794 | B1 * | 10/2011 | Freeman | 181/202 |
| 8,204,561 | B2 | 6/2012 | Mongan et al. | |
| 8,230,992 | B2 | 7/2012 | Law et al. | |
| 8,256,568 | B2 * | 9/2012 | Lin | 181/179 |
| 8,267,251 | B2 | 9/2012 | Mongan et al. | |
| 8,327,974 | B1 * | 12/2012 | Smith et al. | 181/175 |
| 8,383,216 | B1 | 2/2013 | Hynecek | |

(Continued)

FOREIGN PATENT DOCUMENTS

| EP | 0896769 B1 | 11/1997 |
|---|---|---|
| KR | 10-2008-0037320 | 4/2008 |

(Continued)

*Primary Examiner* — Forrest M Phillips
(74) *Attorney, Agent, or Firm* — Loginov & Associates, PLLC; William A. Loginov (57) ABSTRACT

An amplifying cover for an audio device that enhances the audio output of the device, such as voice or music, louder and clearer, without adding to the bulk of the device. The cover redirects the audio output of the device to a different location that enhances the ergonomics of the device. The amplifying cover can redirect the sound (while also amplifying it) to the top of the device, closer to the user's ear, or to the side of the device. The amplifying cover can redirect the sound to a plurality of different directions, making it easier to make conference calls. The cover is a protective case for an electronic device that also amplifies the sound produced by the electronic device. The cover provides a portable and compact acoustic amplifier for an electronic device that can be permanently or semi-permanently attached to the electronic device.

19 Claims, 10 Drawing Sheets

(56) References Cited

U.S. PATENT DOCUMENTS

| | | | |
|---|---|---|---|
| 8,522,917 B1* | 9/2013 | Oh et al. | 181/192 |
| 8,596,412 B1* | 12/2013 | Jorgensen | 181/205 |
| 8,596,449 B2 | 12/2013 | Mongan et al. | |
| 8,714,347 B2 | 5/2014 | Mongan et al. | |
| 8,755,852 B2 | 6/2014 | Hynecek et al. | |
| 8,780,535 B2 | 7/2014 | Mongan et al. | |
| RE45,179 E | 10/2014 | Bodkin et al. | |
| D718,657 S | 12/2014 | Piatt et al. | |
| D719,559 S | 12/2014 | Dukerschein et al. | |
| 2002/0009195 A1* | 1/2002 | Schon | 379/454 |
| 2005/0255895 A1* | 11/2005 | Lee et al. | 455/573 |
| 2006/0175370 A1 | 8/2006 | Arney et al. | |
| 2007/0223745 A1 | 9/2007 | Feng et al. | |
| 2008/0202844 A1 | 8/2008 | LeClear et al. | |
| 2008/0245452 A1 | 10/2008 | Law et al. | |
| 2008/0247749 A1 | 10/2008 | Law et al. | |
| 2009/0184145 A1 | 7/2009 | Yeh | |
| 2009/0194445 A1 | 8/2009 | Mongan et al. | |
| 2010/0183179 A1 | 7/2010 | Griffin, Jr. et al. | |
| 2010/0203931 A1 | 8/2010 | Hynecek et al. | |
| 2010/0219012 A1 | 9/2010 | Baumbach | |
| 2011/0221319 A1 | 9/2011 | Law et al. | |
| 2011/0273773 A1 | 11/2011 | Mongan et al. | |
| 2012/0024560 A1 | 2/2012 | Mongan et al. | |
| 2012/0024619 A1 | 2/2012 | Lin | |
| 2012/0027237 A1 | 2/2012 | Lin | |
| 2012/0031788 A1 | 2/2012 | Mongan et al. | |
| 2012/0044638 A1 | 2/2012 | Mongan et al. | |
| 2012/0067751 A1 | 3/2012 | Mongan et al. | |
| 2012/0160720 A1 | 6/2012 | Mongan et al. | |
| 2012/0181196 A1 | 7/2012 | Mongan et al. | |
| 2012/0285859 A1 | 11/2012 | Law et al. | |
| 2013/0001105 A1 | 1/2013 | Mongan et al. | |
| 2013/0068634 A1 | 3/2013 | Hynecek | |
| 2013/0093123 A1 | 4/2013 | Hynecek | |
| 2013/0126531 A1 | 5/2013 | Hynecek et al. | |
| 2013/0241381 A1 | 9/2013 | Hynecek et al. | |
| 2014/0076747 A1 | 3/2014 | Mongan et al. | |
| 2014/0092536 A1 | 4/2014 | Dukerschein et al. | |
| 2014/0097102 A1 | 4/2014 | Piatt et al. | |
| 2014/0110275 A1 | 4/2014 | Wu et al. | |
| 2014/0202887 A1 | 7/2014 | Mongan et al. | |
| 2014/0202891 A1 | 7/2014 | Piatt et al. | |
| 2014/0243053 A1 | 8/2014 | Hynecek et al. | |
| 2014/0364178 A1 | 12/2014 | Hynecek et al. | |

FOREIGN PATENT DOCUMENTS

| | | |
|---|---|---|
| WO | 0017736 | 3/2000 |
| WO | 2006074327 A2 | 7/2006 |
| WO | 2008095342 A1 | 8/2008 |
| WO | 2009037599 A2 | 3/2009 |
| WO | 2010033131 A1 | 3/2010 |
| WO | 2010090935 A1 | 8/2010 |
| WO | 2011066682 A1 | 6/2011 |
| WO | 2011115918 A1 | 9/2011 |
| WO | 2012015981 A1 | 2/2012 |
| WO | 2012027301 A2 | 3/2012 |
| WO | 2012040306 A3 | 3/2012 |
| WO | 2012092151 A2 | 7/2012 |
| WO | 2012097328 A2 | 7/2012 |
| WO | 2013043462 A1 | 3/2013 |
| WO | 2013043465 A1 | 3/2013 |
| WO | 2013055928 A1 | 4/2013 |
| WO | 2013078060 A1 | 5/2013 |
| WO | 2014039516 A3 | 3/2014 |
| WO | 2014059015 A1 | 4/2014 |
| WO | 2014081717 A1 | 5/2014 |
| WO | 2014197874 A1 | 12/2014 |

* cited by examiner

AMPLIFYING COVER FOR A PORTABLE AUDIO DEVICE

RELATED APPLICATIONS

This application claims the benefit of U.S. Provisional Application Ser. No. 61/699,712, filed Sep. 11, 2012, entitled SOUND JACKET, by Matthew Freshman, et al., the entire disclosure of which is herein incorporated by reference.

FIELD OF THE INVENTION

The field of this invention relates to acoustic amplifiers for portable audio devices and more particularly, to acoustic amplifiers for portable audio devices.

BACKGROUND OF THE INVENTION

Most cellular phones and smartphones include a speakerphone function, which is useful for those who wish to use the phone in hands-free mode, or those who want to hold the phone further away from their head to avoid unhealthy doses of radiation exposure. Also, since many smartphones also comprise an audio/video player function, some users can want to use them to listen to music, watch movies, or play games. The term "smartphone" refers to a mobile phone or communications device built on a mobile operating system and provided with more advanced computing capability and connectivity than a network phone. Recent developments include the incorporation of the reception of radio transmissions and other audio transmissions. Since the built-in speakers that are included in such devices are, by necessity, quite small, they often do not provide adequate volume to be easily audible to the user. There are sounds other than voice, music and audio transmissions that are emitted by the audio device speaker, including but not limited to, tones, telephone ringers and other sounds that are emitted by the speaker port of most audio devices instead of the less powerful speaker found on certain smartphones, for example, on the Apple iPhone®. Typically, smartphones and similar products (i.e. portable audio devices) are built to be small, with a height of approximately 4.5 to 4.9 inches (115-124 mm), a width of approximately 2.3 inches (58.6 mm) and a thickness of 0.3-0.37 inches (7.6-9.3 mm). A need therefore exists for amplification of the sound produced by these devices. While such amplification can be accomplished by electronic means, it is simpler and less energy-intensive to amplify the sound acoustically by means of an acoustic horn or resonating chamber.

There are several such amplification devices on the market. Some are configured with docking stations for a smartphone that include a resonating chamber with an acoustic horn shape. Another device currently on the market is a horn-shaped structure that attaches to a smartphone and can be used as a smartphone stand. However, such devices are not portable and can be very bulky. A user may not wish to carry both the smartphone and the amplification device.

One currently marketed device is a case for a smartphone that provides a gap between the lower edge of the smartphone and the lower edge of the case, allowing for a compact, low-depth resonance chamber. However, it does not provide adequate amplification due to the small size of the resonance chamber.

It is therefore desirable to provide an sound amplifying cover for a smartphone or similar electronic device that is portable, does not add significant bulk to the device, and that amplifies the device's sound more efficiently than existing prior art devices.

SUMMARY OF THE INVENTION

This invention overcomes disadvantages of the prior art by providing a sound jacket, an amplifying cover that enhances the audio output of an electronic device, such as voice or music, making it louder and clearer without adding bulk to that electronic device. The amplifying case redirects the audio output of an electronic device to a different location that enhances the ergonomics of the device. For example, if the sound emanates from the bottom of the electronic device, the amplifying case can redirect the sound (while also amplifying it) to the top of the device, closer to the user's ear, or to the side of the device. The amplifying case can also redirect the sound to a plurality of different directions, making it easier to make conference calls. The amplifying cover is a protective case for an electronic device that also amplifies the sound produced by the electronic device. The amplifying case provides a portable and compact acoustic amplifier for an electronic device that can be permanently or semi-permanently attached to the electronic device. The case is an acoustic amplifier for an electronic device that can be used by the hearing impaired user in another embodiment. In a further embodiment, the case is an acoustic amplifier for an electronic device that vibrates in response to the sound produced by said electronic device. The present device provides systems and methods for amplifying sound emanating from a smartphone or other electronic device. According to various embodiments, an amplifying case for a smartphone or other electronic device is provided, said amplifying case comprising an acoustic resonance chamber built into at least one of the walls of said amplifying case (i.e. a fully or partly hollow wall), and an adapter connecting said acoustic resonance chamber to the speaker or microphone of the phone or other electronic device. According to other embodiments, a compact acoustic amplifier is provided, said compact acoustic amplifier comprising an acoustic resonance chamber built into a hollow wall and attaching to the back of a smartphone or other electronic device.

In an embodiment, the amplifying case is arranged and sized to engage a smartphone, and is arranged with at least one hollow wall and an enclosed resonance chamber within it. The resonance chamber has an opening that is acoustically coupled to the speakerphone speaker on the smartphone when the smartphone is inserted into the amplifying case. In another embodiment, the resonance chamber is shaped like an acoustic horn.

In a further embodiment, the resonance chamber is rectangular in shape, and comprised of a plurality of parallel linear dividers extending part of the way through the rectangular resonance chamber that are arranged to form an acoustic horn. These linear dividers can be provided with bulbous ends in order to change the sound quality.

In an embodiment, the resonance chamber can vibrate in response to certain frequencies of sound. This can be helpful in enhancing the gaming experience or in helping hard-of-hearing users. The resonance chamber can be provided with a shape that amplifies certain frequencies of sound more than others. This can facilitate speech intelligibility, aid people with a hearing loss, or compensate for the poor quality of smartphone speakers. The resonance chamber can be provided with posts placed within it in such a way as to affect its frequency response. In other embodiments, the front wall and back wall are non-parallel, which helps enhance the resonance properties of the acoustic horn.

In an embodiment, an amplifying cover for a portable audio device is comprised of at least one wall assembly that engages a side of the audio device and defines an enclosed space; a resonance chamber within the space constructed and arranged to define an acoustic horn contained within said wall; a first opening for receiving emitted sound waves from a speaker of the audio device; and at least one second opening located along a perimeter of the amplifying cover for emitting the sound waves. The first opening is narrower than the second opening. The resonance chamber comprises a front resonance chamber wall and a back resonance chamber wall that is in proximity to the audio device when in use. An acoustic coupling opening is located at the first opening in proximity to a speaker of the audio device. The resonance chamber comprises a plurality of linear dividers extending part of the width of the resonance chamber, each linear divider connecting the front resonance chamber wall with the back resonance chamber wall, and being constructed and arranged to define an acoustic horn within the hollow chamber. The linear dividers can have bulbous ends. The second opening is located in proximity to a top of the audio device. The resonance chamber is constructed and arranged to vibrate and provide maximum vibration in response to predetermined frequencies of sound used in electronic game playing and defines a shape that enhances the resonance of predetermined frequencies of sound. The predetermined frequencies of sound can be frequencies related to speech intelligibility and are frequencies related to a user's hearing loss. The predetermined frequencies of sound can be frequencies that are inefficiently reproduced by a speakerphone speaker of the audio device. The resonance chamber defines a shape that is constructed and arranged to vibrate in response to predetermined frequencies and includes a front resonance chamber wall and a back resonance chamber wall and the cover comprises at least one post connecting the front resonance chamber wall and the back resonance chamber wall. At least one of the posts is constructed and arranged to stiffen the resonance chamber and to prevent crush damage and can be constructed and arranged to modify a frequency response of the resonance chamber. A front wall of the case is non-parallel to a back wall of the case. A channel of the resonance chamber defines one of an S shape, a double S shape, a zigzag shape, a zigzag shape with bulbs, or a vee shape. The cover includes at least one of a beveled edge to support a tilted orientation, a stand for elevating the audio device and attached cover to a tilted orientation, a hook for hanging the audio device and attached cover, or integral magnets for attaching the audio cover to a magnetic conductive surface. An amplifying cover for a portable audio device comprising a cover assembly including a rim constructed and arranged to removably secure to a perimeter of the audio device and defining therein a resonance chamber; and an internal divider structure that separates an enclosed space defined by the cover assembly into a plurality of channels through which sound travels from a speaker of the audio device to an outlet located along a portion of the cover assembly. The divider structure includes a plurality of walls that engage a back of the audio device. In an embodiment, the audio device can be a smartphone.

BRIEF DESCRIPTION OF THE DRAWINGS

The invention description below refers to the accompanying drawings, of which.

DETAILED DESCRIPTION

I. Overview of the Amplifying Cover

The illustrative embodiments herein described desirably provide for a device to make the audio output of an electronic device, such as voice or music, louder and clearer than they would be without the benefit of the amplifying cover, without adding a lot of bulk to the electronic device. It is further desirable to redirect the audio output of an electronic device to a different location that enhances the ergonomics of the device. For example, if the sound emanates from the bottom of the electronic device, the amplifying case or "cover" can redirect the sound (while also amplifying it) to the top of the device, closer to the user's ear, or to the side of the device. The amplifying cover can also redirect the sound to a plurality of different directions, making it easier to make conference calls. The amplification cover can be both a protective case for the smartphone and an sound amplifying cover. It is also desirable to provide a portable and compact acoustic amplifier for an electronic device that can be permanently or semi-permanently (removably) attached to the electronic device. It is desirable to provide an acoustic amplifier for an electronic device that can be used by the hearing impaired user. It is also desirable to provide an acoustic amplifier for an electronic device that vibrates in response to the sound produced by said electronic device.

II. Illustrative Embodiments

Figure 1:
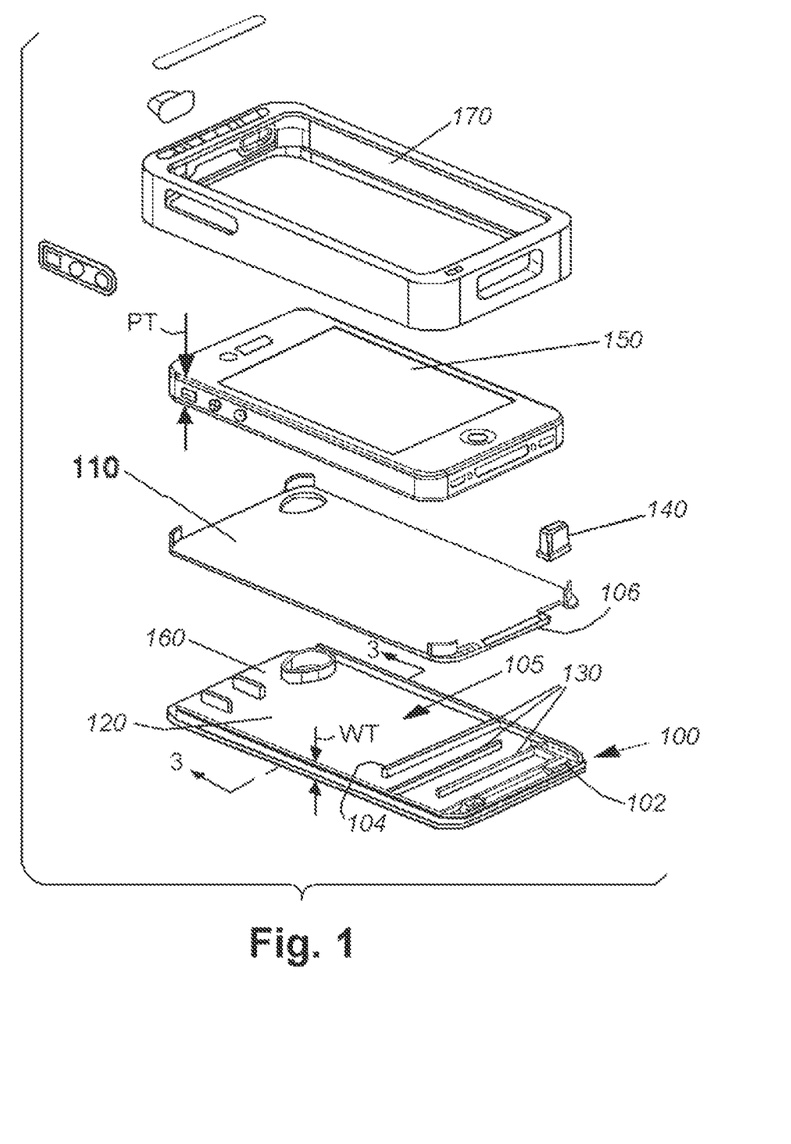
FIG. 1 is an exploded perspective view of an amplifying case or cover, according to an illustrative embodiment.

FIG. 1 shows an exploded view of one embodiment of a cover for an electronic audio device (e.g. a smartphone, MP3 player iPod®, etc.), also termed herein, a "sound jacket". The amplifying cover is fabricated into the back of the holder for a smartphone. The amplifying cover defines a detachable amplification assembly. In an embodiment, the amplifying cover 100 is comprised of at least one wall that removably engages a side of a smartphone, an acoustic resonance chamber 105 that is formed by the front piece 120 and the back piece 110 and is a hollow space, a first opening 102 and a second opening 160. The wall is part of the wall assembly structure and is a support member located along the perimeter of the amplifying cover that spans from front to back. The sound waves enter the amplifying cover at the first opening and proceed through the resonance chamber to exit and be disseminated from the second opening, or outlet. The amplifying cover can amplify tones that are in addition to music or voice sounds (for example, telephone ringer tones).

The second opening 160 is the outlet for air traveling in sound waves. The first opening 102 is narrower than the second opening 160. The second opening can be provided with a covering that is constructed and arranged so as to provide for the passage of air and that prevents small objects from entering the second opening. The location of the first opening 102 provides for an acoustic coupling to a speakerphone system on the smartphone when the smartphone is engaged with the amplifying cover and the location of the first opening can vary depending on the type of smartphone and location of its respective opening. The coupling is an adaptor that is constructed and arranged to adapt to a particular model of smartphone to create a snug fitment. The hollow space between the back piece 110 and the front piece 120 is connected by means of an inlet 140 to the speakerphone of the iPhone 150, to direct the air from the speakerphone into the acoustic resonance chamber 105. The resonance chamber 105 is comprised of the front resonance chamber wall 104 and the back resonance chamber wall 106. The back resonance chamber wall 106 is in proximity to the smartphone 150 when in use. The resonance chamber 105 is constructed and arranged to form an acoustic horn. A linear divider structure is more generally any number of shapes that form the internal geometry of the resonance chamber and related structures. Linear dividers 130 are present on the inside of the acoustic resonance chamber 105 to create an acoustic horn configuration that is curved over several U-turns to provide greater length and therefore greater amplification. The outlet 160 of the acoustic horn is open. An outer enclosing rim 170 removably attaches to the acoustic resonance chamber to form the smartphone cover, and presses the acoustic coupling 140 into the speakerphone outlet of the smartphone 150 to improve the seal. The amplifying cover 100 is constructed and arranged to the proportions and dimensions of the relevant smartphone. The wall thickness WT of the amplifying cover 100 is less than the thickness PT of the smartphone 150. The overall width and length of the amplifying cover will vary based on predetermined dimensions of the relevant smartphone.

The amplifying cover can be illustratively fabricated of a rigid or semi-rigid material, including injection-molded elastomeric polymers, for example, plastic, nylon, Delrin, acrylics, silicone, and other polymers with varying durometers. The material used can be opaque, transparent, and/or translucent, in whole or in part. In an embodiment, it is assembled by ultrasonic welding. It can be assembled by other assembly processes. The amplifying cover is flexible for improved ease of attachment and detachment. The flexible amplifying cover can provide a snug fitment to the engaged smartphone. In other embodiments, the overall amplifying cover is rigid and the attachment surfaces are flexible. It further contemplated that the cover can have a snug fit with the smartphone, such that where there are missing portions of the perimeter wall of the chamber, the snug fit to the smartphone creates a wall.

Figure 2A:
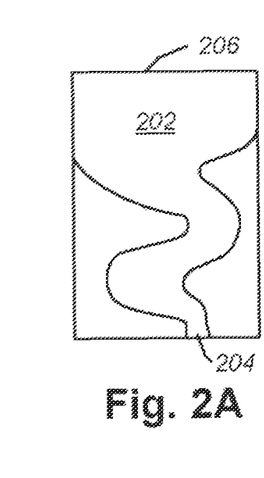
FIG. 2A is a frontal view of an amplifying cover having a curved resonance chamber, according to an illustrative embodiment.

The acoustic resonance chamber can be shaped in various ways, as shown in FIGS. 2A-E. FIG. 2A is an embodiment that is constructed and arranged with a channel 202 within the hollow wall where the width of the channel gets progressively larger as one moves along its length from the first opening (throat) 204 to the outlet (mouth) 206—i.e., an acoustic horn. The channel 202 defines an "S" shape. It is contemplated that the outlet of the acoustic resonance chamber can be left open, or that in other embodiments, the outlet can be covered with a grill or mesh to prevent objects from falling into it.

Figure 2B:
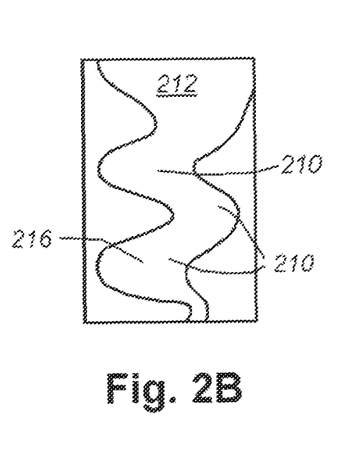
FIG. 2B is a frontal view of an amplifying cover having a multiplied curved resonance chamber, according to an illustrative embodiment.

With reference to FIG. 2B, the number of curves 210 in the channel 212 can vary. In this embodiment, three curves 210 are shown. In other embodiments, the number of curves can be greater. The number of curves modifies, or "tunes" the sound output. The channel 216 defines a "Double S" shape.

Figure 2C:
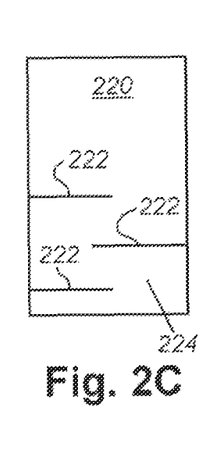
FIG. 2C is a frontal view of an amplifying cover having linear dividers, according to an illustrative embodiment.

FIG. 2C is another embodiment in which the acoustic resonance chamber 220 defines a rectangle in shape and is an entirely hollow rectangular wall with parallel linear dividers 222 that span part of the width of the hollow wall, to direct the sound in an S-curve pattern along a channel that forms an acoustic horn. The channel 224 defines a "zigzag" shape.

Figure 2D:
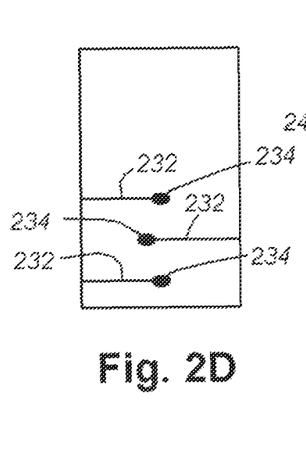
FIG. 2D is a frontal view of an amplifying cover having linear dividers, each having a bulb at one end, according to an illustrative embodiment.

In FIG. 2D the parallel linear dividers 232 are provided with bulbous ends 234 to eliminate the sharp corners in the path of the sound and change the frequency response of the device. The channel 234 defines a "zigzag shape" with bulbs.

Figure 2E:
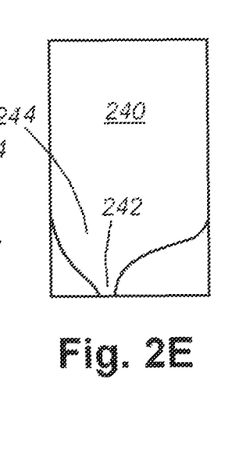
FIG. 2E is a frontal view of an amplifying cover having a large resonance chamber, according to an illustrative embodiment.

FIG. 2E is an embodiment that is constructed and arranged to provide an acoustic resonance chamber 240. A channel 242 leads to a resonating cavity 244. It is expressly contemplated that other embodiments can be provided with other shapes for the acoustic resonance chamber. The illustrative channel 242 defines a "vee" shape.

The frequency response of the acoustic resonance chamber depends on its shape. For example, a curved acoustic horn such as the one shown in FIG. 2A produces greater amplification of low frequencies and relatively lesser amplification of high frequencies, creating a warmer sound. Linear dividers, such as the ones shown in FIG. 2C, result in relatively greater amplification of higher frequencies. The frequency response can be changed or "tuned" by increasing or decreasing the number of curves in the acoustic horn, the rate of widening of the acoustic horn, or other parameters in its shape. Similarly, for another type of acoustic resonance chamber that is not an acoustic horn, the frequency response can also be changed by changing its shape.

In further embodiments, the shape of the acoustic resonance chamber is optimized to preferentially amplify certain frequencies—the frequencies that are most important for the intelligibility of human speech or for a more pleasing music listening experience. Amplifying the higher frequencies (i.e., in the range of 2 kHz to 6 kHz) results in improvement of intelligibility, since those frequencies contain a large amount of the information the human auditory system uses to process speech. In contrast, amplifying the lower frequencies (i.e., in the range of 20 Hz to 400 Hz), which tend to be weaker in smartphone speakers due to their small size, results in a flatter frequency response and a more pleasing music listening experience. Other frequency tailoring can be implemented so as customize the device to the needs of a particular user. For example, a hard-of-hearing user can need high frequencies to be preferentially amplified to compensate for their hearing loss, or can need low frequencies to be preferentially amplified to increase the vibrations of the phone that the user can feel. A user who typically uses their smartphone in a car can need to amplify the frequencies that are most likely to be masked by engine noise.

In some embodiments, the back of the acoustic resonance chamber can vibrate in a way that the user can feel when holding the device. This will improve the music-listening experience for hearing impaired users, as well as providing tactile feedback for gaming. The shape of the acoustic resonance chamber can be optimized to vibrate most strongly to the lower frequencies used in gaming (and game developers can determine which frequencies to amplify during production) to provide tactile feedback, or to the low frequencies that a hearing impaired user would need to feel in order to respond to music. The cover can be tuned to vibrate at certain frequencies. The vibration can be provided by vibrating the front and outer walls and/or interior structures, as well as the interior trapped air itself. There can be a plurality of vibrating elements. The cover can also be tuned to enhance the sound output from a smartphone with a speaker system that does not efficiently reproduce certain frequencies, in part or in whole. By inefficiently reproduced, it is meant that the sound is not reproduced well by the speaker and is subject to garbling, unintelligibility and a lack of fidelity to the original sound emission.

Figure 3:
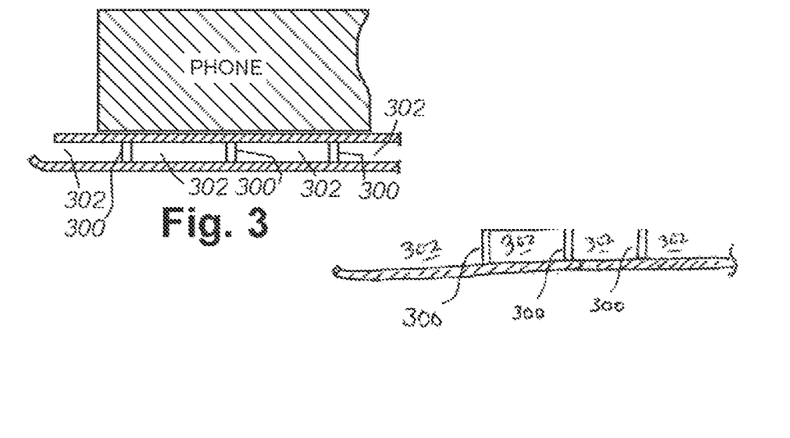
FIG. 3 is a partial cross-sectional view along lines 3-3 of FIG. 1 of the cover, according to the illustrative embodiment.

In additional embodiments, in FIG. 3, the acoustic resonance chamber 302 can be provided with a plurality of support posts 300 that connect the front wall and back wall of the acoustic resonance chamber. These support posts serve as reinforcement members that stiffen the resonance chamber to prevent crush damage, and they reduce the resonance of certain low frequencies, changing the frequency response curve to improve speech intelligibility. The number, shape, and position of the support posts can be varied to "tune" the frequency response. Placement of the posts can be in part based upon structural considerations, for example, anti-crush protection.

Figure 4:
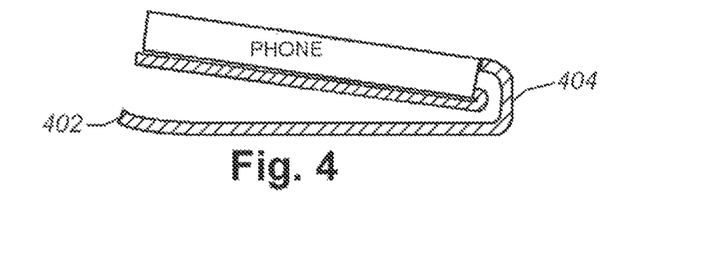
FIG. 4 is a partial cross-sectional view of a cover having a non-parallel geometry, according to the illustrative embodiment.

While in some embodiments of the amplifying cover, the front and back walls of the acoustic resonance chamber are parallel, other embodiments allow for a slight angular orientation between the front 402 and back wall 404. FIG. 4 shows a cross-sectional view of one of these embodiments that is slightly exaggerated to improve visibility of the angle. This enhances the amplification properties of the acoustic resonance chamber, since the cross-sectional area of the air channel increases as one gets further from the inlet.

Figure 5:
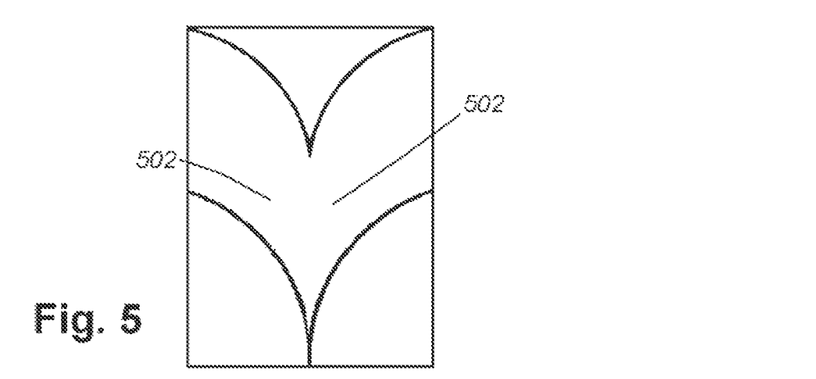
FIG. 5 is a frontal view of a cover that includes a plurality of outlets, according to the illustrative embodiment.

In the embodiments as shown in FIGS. 1-4 of the outlet of the acoustic resonance chamber is located at the top of the smartphone. This arrangement redirects the sound to a more ergonomic position for the user when using the smartphone normally. In other embodiments, the outlet can be located elsewhere, or there can be a plurality of outlets 502, as shown in FIG. 5. In this embodiment, the internal divider structure separates the enclosed space into a plurality of channels. An amplifying cover with multiple outlets is useful when using the smartphone as a speakerphone for a conference or meeting.

Figure 6A:
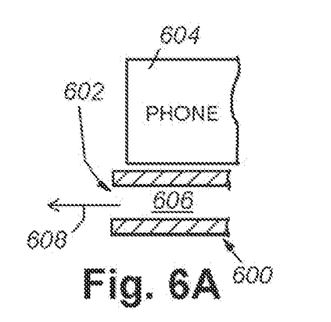
FIG. 6A is a side view of a cover that includes a forward directed outlet, according to an illustrative embodiment.
Figure 6B:
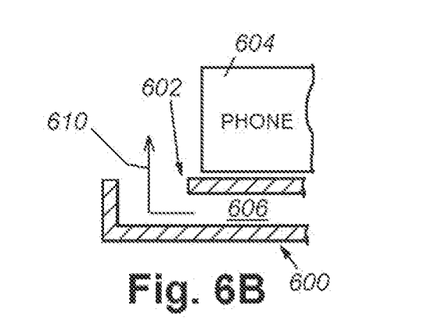
FIG. 6B is a side view of a cover that includes an upward directed outlet, according to an illustrative embodiment.
Figure 6C:
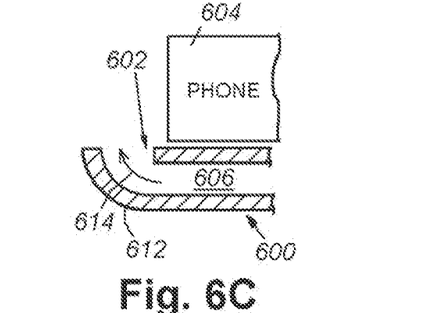
FIG. 6C is a side view of a cover that includes an upward directed outlet with a curved wall section, according to an illustrative embodiment.

FIGS. 6A-C shows three different directional orientations of the outlet 602, relative to the position of the phone 604 in a cross-sectional view and attached amplifying cover 600.

In FIG. 6A, the outlet 602 of the acoustic resonance chamber 606 can be directed forward so that the sound travels along a path 608.

In FIG. 6B, the outlet 602 is directed upward so that the sound path 610 is directed upward, resulting in preferential amplification of high frequencies.

FIG. 6C shows an upward directed outlet 602 having a curved wall section 612. The curved wall section 612 alters the geometry of the amplifying cover 600 and smoothens the path 614 that the air takes to exit the chamber, and results in relatively lesser amplification of high frequencies and greater amplification of low frequencies. This smoothness can be increased in the fabrication process by using materials having a low friction coefficient, for example, providing a lining of graphite filled nylon to the walls and dividers. Conversely, sound deadening/dampening materials and/or textured surfaces can be provided to alter the emitted sound and frequencies. In other embodiments, a batting material, for example, a gauze and/or gauze-like material, can be inserted into the air filled cavity in the middle of the resonating chamber (not in proximity to the walls). The circuitous path of the sound waves through this material extends the wavelength of the sound waves, lowering the resulting frequency of the sounds which pass through.

Note, as used herein, the terms "front" and "back" refer to proximity to the smartphone when the smartphone is engaged with the cover. The term "back" as applied to the amplifying cover refers to being in proximity to the smartphone and "front" refers to the opposite direction and not in proximity to the smartphone. The "top" when related to the audio device refers to that portion that is at the top of the device when held by the user. The "front" of the audio device refers to the surface of the smartphone not facing the resonance chamber, while the "back" of the audio device refers to the surface in proximity to the resonance chamber. More generally, as used herein the directional terms, such as, but not limited to, "up" and "down", "upward" and "downward", "rearward" and "forward", "top" and "bottom", "inside" and "outer", "front" and "back", "inner" and "outer", "interior" and "exterior", "downward" and "upward", "horizontal" and "vertical" should be taken as relative conventions only, rather than absolute indications of orientation or direction with respect to a direction of the force of gravity.

Figure 7:
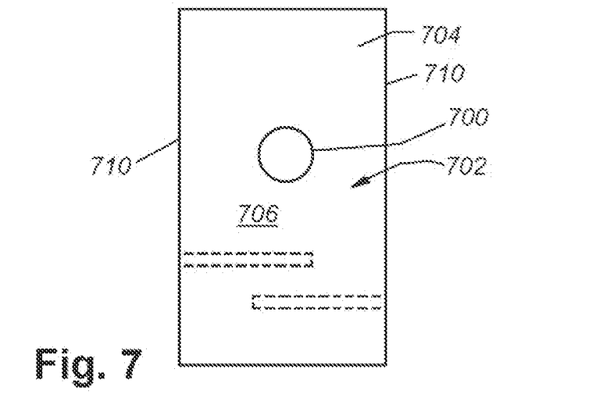
FIG. 7 is a frontal view of a cover that includes a hole in the back, according to an illustrative embodiment.

FIG. 7 depicts an amplifying cover 702 that includes at least one outlet ("hole") 700 in the front wall 704 of the acoustic resonance chamber 706. The hole 700 is placed in such a way as to tune the frequency response curve to a first desired configuration for the user. The user can then cover up hole 700 with one or more of their fingers to change the frequency response curve to a second desired configuration— for example, when inside a noisy vehicle, or when talking on the phone as opposed to listening to music. It is expressly contemplated that an amplifying cover can be provided with a multiplicity of holes that the user can cover or leave uncovered in order to "tune" the frequency response curve to a desired configuration. At least one hole can be placed in one or more of the side walls 710 of the acoustic resonance chamber 706 rather than the front wall 704.

Figure 8:
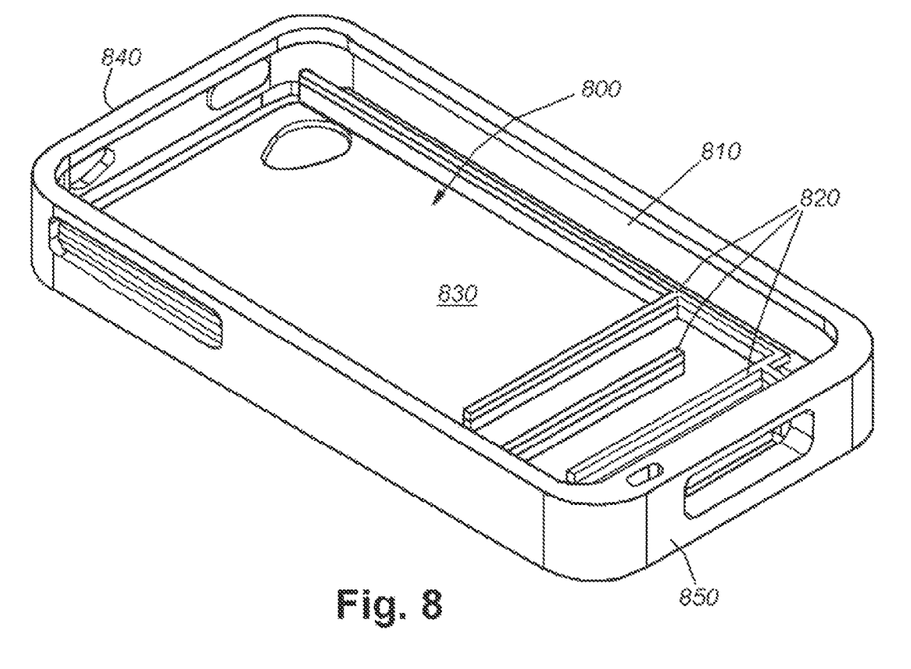
FIG. 8 is a perspective view of a cover that is sealed and has no outlet, according to an illustrative embodiment.

FIG. 8 depicts an amplifying cover 800 with related elements in an assembled state. An outer enclosing rim 810 is provided for attachment to a smartphone (not shown). Linear dividers 820 are present on the inside of the acoustic resonance chamber 830 to create an acoustic horn configuration. Certain smartphones, such as the Apple iPhone®, are constructed and arranged so that the inlet of the acoustic resonance chamber 830 is connected to the audio input at the speakerphone port of the smartphone in an airtight way by means of an elastic gasket. The gasket can be fabricated from the same material as the amplifying cover or of another natural or synthetic elastomeric polymer, for example, rubber. The acoustic resonance chamber 830 is open on the side facing the back of the electronic device. The back of the electronic device forms one of the walls of the acoustic resonance chamber. The walls of the acoustic resonance chamber that are in contact with the back of the electronic device are provided with airtight seals made of silicone rubber or similar elastomeric material, so that the acoustic resonance chamber is airtight. This reduces the thickness of the acoustic resonance chamber and the bulk that is added to the size of the device; however, due to the requirement for an airtight seal between the walls of the acoustic resonance chamber and the back of the device, this can be expensive to manufacture. Illustratively, the airtight seals can be connected to the elastic gasket, or can be separate from it. Furthermore, the airtight seals can also continue all the way to the outside front edge, to seal the cover to the device.

In other embodiments, the acoustic resonance chamber is collapsible and the distance between the front 840 and back walls 850 can be manually changed by the user with a snapping lock (not shown) or similar mechanism, for example, a hook, tab, or hook and loop closure. This reduces the size of the acoustic resonance chamber when not in use and increases its size when it is in use. The user can also change the angle between the front and back walls to "tune" the frequency response as desired. In those embodiments, the front walls, back walls, and any other walls or ribs that form the acoustic resonance chamber, are made of elastic accordion-folded material that allows the walls to be very close together when folded and to be further apart when unfolded, in a stable configuration.

Figure 9:
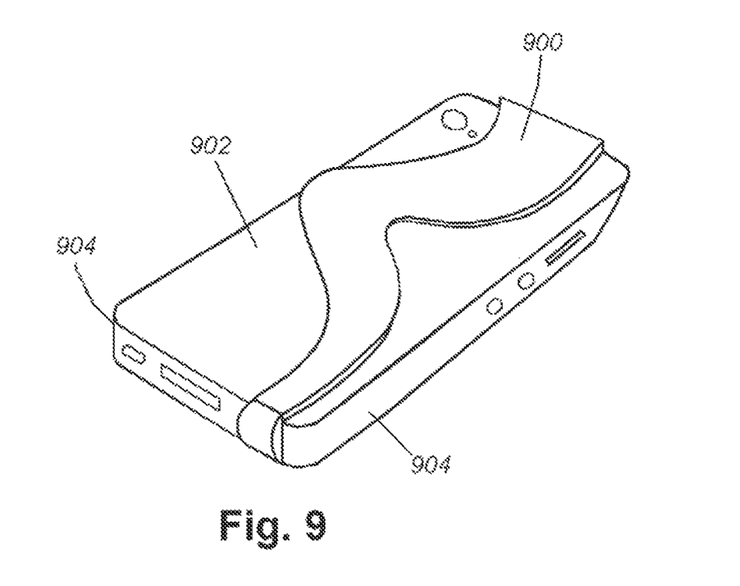
FIG. 9 is a perspective view of a cover that is constructed and arranged so as to define a geometry that is smaller than the smartphone, according to an illustrative embodiment.

In FIG. 9, the amplifying cover is constructed and arranged as a flat resonator 900 that readily adheres to the back of the smartphone 902 by adhesive tape or another connective mechanism, leaving the sides 904 free. The flat resonator can be shaped and tuned in any way described above.

Figure 9A:
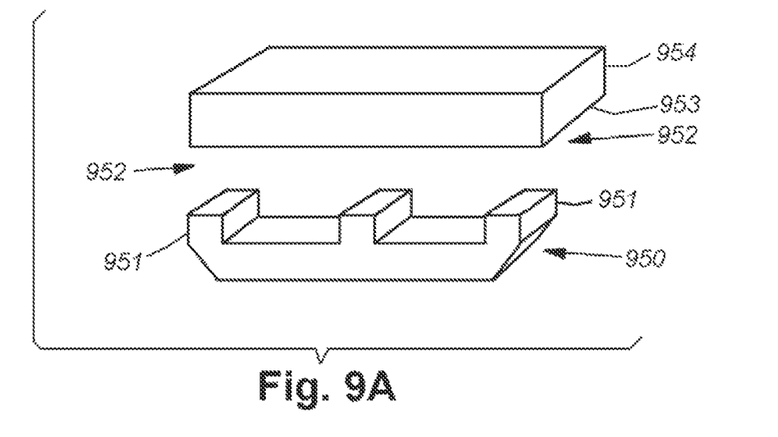
FIG. 9A is a schematic view of the cross section of a smartphone and amplifying cover where there is an open portion of the resonance chamber wall, according to an illustrative embodiment.

It is further contemplated that a cover can be constructed and arranged such that the cover fits snugly to the smartphone so that the chamber wall in proximity to the smartphone is not required to be complete and the surface of the smartphone serves as a wall of the resonating chamber. FIG. 9A shows a cover 950 that is constructed and arranged such that the chamber wall 951 does not meet the back 953 of the smartphone 954 and there are portions 952 where the chamber wall is not present. As stated above, the surface of the smartphone is in close enough proximity that it serves as a wall.

Figure 10:
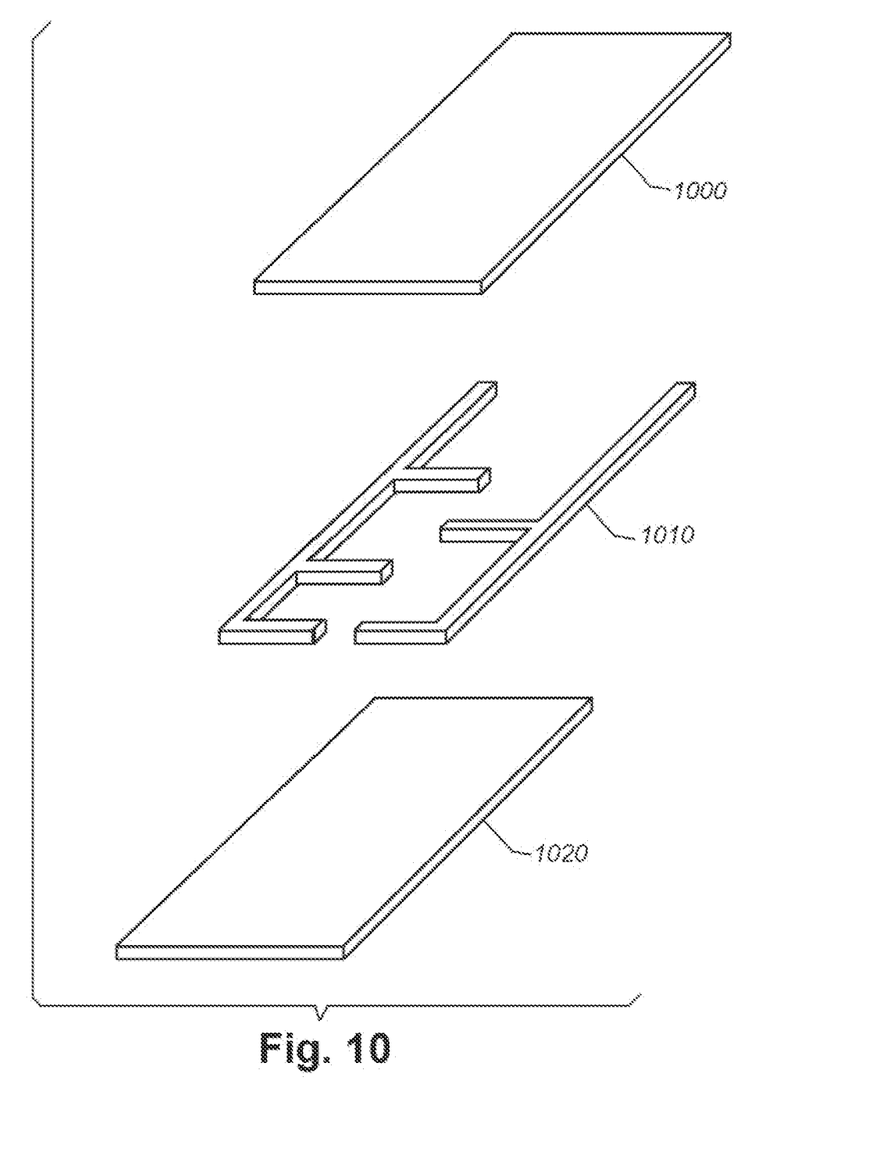
FIG. 10 is an exploded view of the components of the cover, according to an illustrative embodiment.

FIG. 10 is an embodiment wherein the acoustic resonance chamber is assembled from 3 pieces, a front panel 1000, one or more rib pieces 1010, and a back panel 1020. Notably, this arrangement enhances manufacturability by allowing the use of different materials for the rib piece than for the front panel and back panel, and provides that many different acoustic chamber configurations can be manufactured by adapting only one part—the front panel and back panel can be identical regardless of the rib shape.

III. Experimental Results

Figure 11:
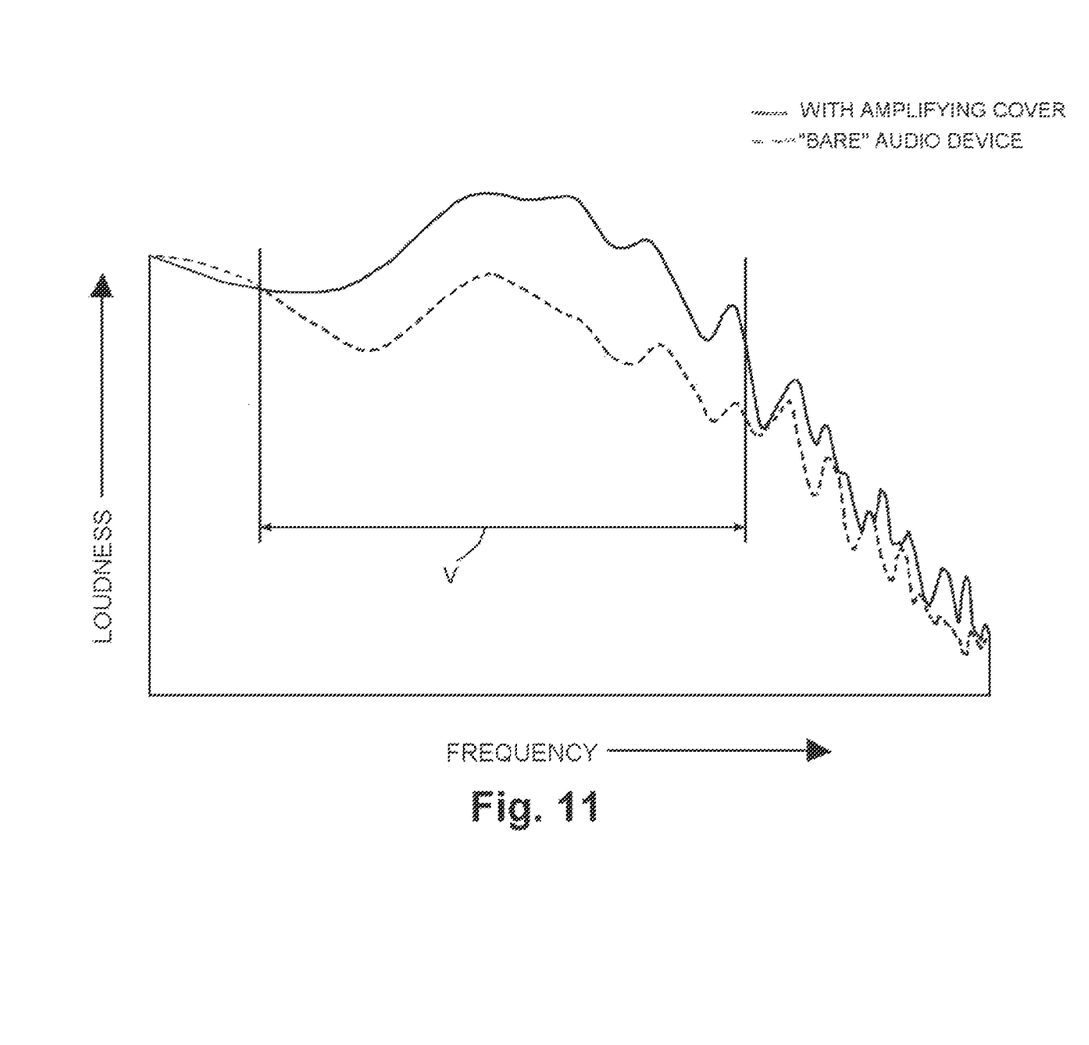
FIG. 11 is a graphical representation of a comparison of the improved audio output using the device to a conventional, unamplified smartphone, according to the illustrative embodiment.

FIG. 11 is a graphic representation 1100 of the improved quality of the sound output of a smartphone provided with an amplifying cover, compared to a smartphone that is not provided with an attached amplifying cover, based on experimental testing data. The vertical axis represents increased loudness of the output and the horizontal axis represents the increased frequency. Frequency range V represents the frequency of the human voice. The performance of the smartphone without further amplification (a "bare" or unamplified smartphone) is shown by a broken line 1102. The performance of the smartphone with the amplifying cover is indicated by a solid line 1104. While the bare smartphone has better performance at the lower frequencies, below the range of the human voice, the amplifying cover provides superior performance across the range of the human voice and above it.

IV. Further Embodiments

Figure 12:
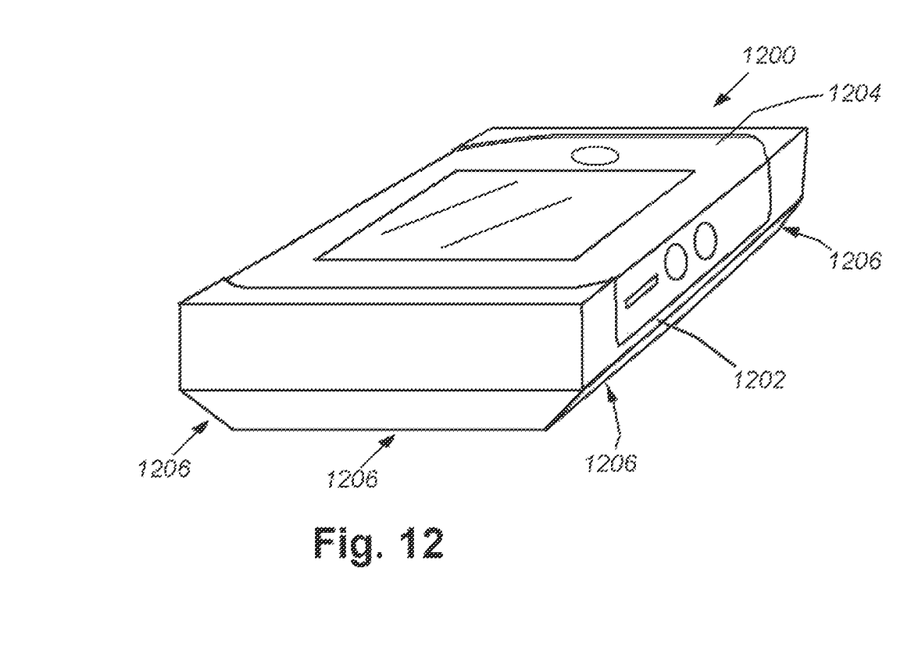
FIG. 12 is a perspective view of a cover having a beveled edge, according to an illustrative embodiment.

FIG. 12 is a view of an amplifying cover assembly 1200 comprised of a cover 1202 and an engaged smartphone 1204. The exterior perimeter of the cover is constructed and arranged with beveled surfaces 1206. The beveled surfaces provide a "tilt" feature. The beveled side edge of the cover can act as a fulcrum, lifting the phone off the surface of the table. As a result of lifting this weight of the phone, the center of gravity of the phone is moved forward resulting in the phone being able to tilt backwards to an angle of approximately 5-20 degrees. This tilt leads to an improved viewing angle for watching videos. It is especially useful for various application, for example Apple's "facetime," Skype, and other video chat services since the front facing camera of the smartphone is automatically angled to more readily capture a view of a seated user's head and body when the phone is on a desk, improving the experience of using conference and video chat software. The construction and arrangement of the cover device can include a relatively large resonance chamber in the wall behind the phone. The line of contact between the back edge of the resonance chamber and a surface such as a table provides support for the phone and chamber to lean back.

It should be clear that the amplifying cover provides a substantially more versatile acoustic amplification of sound and can be used with any device that produces sound, including but not limited to a smartphone, a tablet computer or other miniaturized computer device, a laptop computer, a computer mouse, a keyboard, a speaker, or any other device that produces sound. While the embodiments described above are described with a smartphone such as the Apple iPhone®, the audio device is not limited to smartphones.

It is expressly contemplated that an application for the smartphone can be provided that alters the sound emitted from the smartphone to maximize the performance of the amplifying cover. This application can be particularized for each model of smartphone. The application can be used to improve the performance of certain frequencies and reduce or completely neutralized undesired frequencies. The application can also be provided to be programmed to compensate for environmental noise around the user (for example, the interior of a car, train or ferry boat) and re-tune the sound to overcome that surrounding noise.

In various smartphones, including the Apple iPhone®, where an integral camera is provided on the back of the smartphone body, some embodiments of the amplifying cover can be provided with a conveniently positioned opening for the camera lens. This lens opening can be left open with no further features, or it can comprise a lens hood to keep sunlight from reflecting into the lens, a transparent plate to protect the lens, a removable filter, or a shutter that can open when the user intends to take a picture and that can be closed when the camera is not in use.

In other embodiments, the amplifying cover can be provided with a plurality of at least one of vibrating membranes, strings, or other vibrating members inside the acoustic resonance chamber, or as part of the wall of the acoustic resonance chamber. These membranes or strings or members can further amplify the sound produced by the smartphone or tune the frequency response.

The amplifying cover can also be constructed and arranged to provide for "docking" (attaching) the acoustic resonance chamber to a bigger resonator, for example, to improve the sound when the device is in a docking station. The bigger resonator is coupled to the outlet of the acoustic resonance chamber by means of an elastic gasket or other means known in the art of acoustic amplification. Furthermore, the device in its amplifying cover can be in contact with a larger resonator, so that the vibrations of the acoustic resonance chamber transfer to the larger resonator. Such a resonator can be a specially designed chamber, or can be any flat surface such as a table.

In an embodiment, the amplifying cover can be provided with a deployable stand for holding the smartphone in a raised, or "tilted" orientation for greater ease of viewing (for example, of movies). The raised orientation can be to an angular orientation of 5-20 degrees relative to a horizontal axis. In other embodiments, the angle can vary greater or lesser, and have a mechanism for multiple predetermined positions of elevation. The amplifying cover can also be provided with a deployable hook for suspension of the smartphone, for example, from the rim of a table or other structure. The cover can be provided with attachable or embedded magnets to attach the smartphone and amplifying cover to a magnetic conductive surface (for example, to a vertical stanchion of a weight-lifting device during a workout).

The amplifying cover can include gripping surfaces with flanges extending behind the cover to help support the device in the tilted orientation, as well as reducing unpleasing vibrations and the potential for scratching the cover on the table.

The amplifying cover can comprise a removable panel at the back of the device. This panel can be made of various natural or synthetic materials, or composites thereof, including wood and/or metal. The removable panel can be carefully selected for its acoustic and/or aesthetic properties, and can also provide an opportunity for customized patterns, text, and graphical imagery on its exterior surfaces. Other materials can also be used, as is apparent to a person skilled in the art.

The amplifying cover can be provided with onboard electronic components for further amplification or wireless connection, such as a Bluetooth®-type connection. The electronic components can include a separate onboard speaker or pair of stereo speakers with two completely separate and/or partially separate resonance chambers, connected to each of the two stereo audio components.

The amplifying cover can be provided as part of a kit that includes accessories, for example a spare battery, a solar panel for charging, a strap for hanging the device, various closure systems or other means of mounting the device on an object, supplementary buttons or controls, or a kickstand to enable the device to be positioned at the desired angle. These accessories can be attached to a removable panel; several different removable panels, with different accessories attached, can be included with the amplifying cover. The accessories can also include game controls for those users who desire to use their device for gaming. The kit can include universal adapter components to accommodate attachment to different smartphones. The kit can provide an amplifying cover that can be assembled and disassembled by the user and provide a plurality of resonance chambers of different sizes and shapes for tuning and altering the emitted sound quality. The kit can include an armband, headband or similar band for wearing the smartphone with attached amplifying cover on the body of the user. It is further contemplated that construction and arrangement of the amplifying cover as a combination of interchangeable modules can provide for a plurality of resonance chambers of different sizes, shapes and materials that can be docked and/or attached to different housing devices to hold a multiplicity of resonance chambers to the audio device. This can provide for a variety of amplifying covers for various devices relevant to various activities. For example, a cover for conference calls combined with a cover for gaming or a cover for use while attached to an armband, a car visor or other structure. Module parts can be attached by a variety of mechanisms, including but not limited to, snaps, hooks, magnets and other attachment mechanisms.

As set forth above, the amplifying cover can be provided for gamers having features that are peculiar to gamers, for example, handholds and handholds having game-related actuators. Various of the hollow spaces in the handholds and/or other game controls can be integrated and connected to the amplifying cover for additional air volume and greater amplification of the sound. This extra air volume can be used to add to the amplification and to change the frequency response, enhancing the game controller experience (for example, louder and lower bass sounds).

In further embodiments, the amplifying cover casing can be split or be constructed and arranged to flex in the middle, to make it easier to put on and take off. The amplifying cover can also comprise functional or decorative elements such as a graphic equalizer display or lights that blink in time with the music, either embedded in the material of the amplifying cover or provided as an add-on accessory.

The foregoing has been a detailed description of illustrative embodiments of the invention. Various modifications and additions can be made without departing from the spirit and scope of this invention. Features of each of the various embodiments described above can be combined with features of other described embodiments as appropriate in order to provide a multiplicity of feature combinations in associated new embodiments. Furthermore, while the foregoing describes a number of separate embodiments of the apparatus and method of the amplifying cover, what has been described herein is merely illustrative of the application of the principles of the amplifying cover. Accordingly, this description is meant to be taken only by way of example, and not to otherwise limit the scope of this invention.

What is claimed is:

1. An amplifying cover for a portable audio device, comprising:
   at least one wall having a wall perimeter, the at least one wall facing a side of the audio device;
   an inlet in proximity to a speaker of the audio device;
   a pair of opposing sidewalls that extend a first height from a first surface of the at least one wall, the pair of opposing sidewalls defining an acoustic horn formed between the pair of sidewalls, the at least one wall, and the side of the audio device, the acoustic horn being coupled to the speaker of the audio device via the inlet, the pair of sidewalls forming a first curve that defines a first u-turn in the acoustic horn, a second curve that defines a second u-turn in the acoustic horn;
   at least one outlet opening located along the wall perimeter of the amplifying cover for emitting the sound waves such that the at least one outlet being coextensive with the wall perimeter, wherein a width between the pair of sidewalls progressively increases between the inlet and the outlet.

2. The amplifying cover of claim 1, further comprising a first opening that is narrower than the second opening.

3. The amplifying cover of claim 1 wherein the resonance chamber comprises a front resonance chamber wall and a back resonance chamber wall that is in proximity to the audio device when in use.

4. The amplifying cover of claim 1, wherein an acoustic coupling opening is located at the first opening in proximity to a speaker of the audio device.

5. The amplifying cover of claim 1, wherein the resonance chamber comprises a plurality of linear dividers extending part of the width of the resonance chamber, each linear divider connecting the front resonance chamber wall with the back resonance chamber wall, and being constructed and arranged to define an acoustic horn within the hollow chamber.

6. The amplifying cover of claim 5, wherein the linear dividers include bulbous ends.

7. The amplifying cover of claim 1, wherein the second opening is located in proximity to a top of the audio device.

8. The amplifying cover of claim 1, wherein the resonance chamber is constructed and arranged in a shape to vibrate and provide selected vibration in response to predetermined frequencies of sound that, at least one of, (a) are used in electronic game playing, (b) enhance the resonance of predetermined frequencies of sound, (c) are related to speech intelligibility, (d) are related to hearing loss of a user, (e) are inefficiently reproduced by a speakerphone speaker of the audio device, and (f) comprise desired frequencies.

9. The amplifying cover of claim 1, wherein the resonance chamber includes a front resonance chamber wall and a back chamber resonance wall and the cover comprises at least one post connecting the front resonance chamber wall and the back resonance chamber wall.

10. The amplifying cover of claim 9, wherein at least one of the posts is constructed and arranged to modify a frequency response of the resonance chamber.

11. The amplifying cover of claim 1, wherein a front wall of the cover is non-parallel to a back wall of the cover.

12. The amplifying cover of claim 1, wherein a channel of the resonance chamber defines one of (a) a S shape, (b) a double S shape, (c) a zigzag shape, (d) a zigzag shape with bulbs, or (e) a vee shape.

13. The amplifying cover of claim 1, wherein the cover includes at least one of (a) beveled surface for supporting a raised orientation, (b) a stand for elevating the audio device and attached cover to a raised orientation, (c) a hook for hanging the audio device and attached cover, or (d) integral magnets for attaching to the audio cover and attached cover to a magnetic conductive surface.

14. The amplifying cover of claim 1, wherein an outer side surface of the cover is constructed and arranged with a bevel to facilitate elevation of the combined cover and engaged audio device to a tilted orientation for viewing content thereon.

15. The amplifying cover of claim 1, wherein the cover is constructed and arranged to include electronic components that include at least one of (a) a wireless connectivity component, (b) a separate onboard speaker, and (c) a pair of stereo speakers within the cover.

16. The amplifying cover of claim 1, wherein the cover is constructed and arranged as a combination of interchangeable modules that provides for a plurality of resonance chambers of different sizes, shapes and materials.

17. The amplifying cover of claim 1, wherein the cover includes handles for electronic gaming.

18. An amplifying cover for a portable audio device, comprising:
   at least one wall having a wall perimeter, the at least one wall facing a side of the audio device;
   an inlet in proximity to a speaker of the audio device;
   a plurality of sidewalls that extend a first height from a first surface of the at least one wall, the plurality of sidewalls defining a plurality of acoustic horns, each of the plurality of acoustic horns being formed between at least two of the plurality of sidewalls, the at least one wall, and the side of the audio device, each of the plurality of acoustic horns being coupled to the speaker of the audio device via the inlet;
   a first outlet opening located along a first region of the wall perimeter of the amplifying cover for emitting the sound waves, the first outlet being coupled to a first of the plurality of acoustic horns;
   a second outlet opening located along a second region of the wall perimeter of the amplifying cover for emitting the sound waves, the second outlet being coupled to a second of the plurality of acoustic horns.

19. The cover of claim 18, wherein the first region of the wall perimeter is opposed to the second region of the wall perimeter.

* * * * *